US009296906B2

(12) United States Patent
Nakajima et al.

(10) Patent No.: US 9,296,906 B2
(45) Date of Patent: Mar. 29, 2016

(54) METALLIC PIGMENT COMPOSITION

(75) Inventors: Kazuko Nakajima, Tokyo (JP); Kaoru Ueyanagi, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 36 days.

(21) Appl. No.: 13/701,973

(22) PCT Filed: Jun. 3, 2011

(86) PCT No.: PCT/JP2011/062770
§ 371 (c)(1),
(2), (4) Date: Dec. 4, 2012

(87) PCT Pub. No.: WO2011/155399
PCT Pub. Date: Dec. 15, 2011

(65) Prior Publication Data
US 2013/0078438 A1 Mar. 28, 2013

(30) Foreign Application Priority Data

Jun. 8, 2010 (JP) ................................. 2010-130770

(51) Int. Cl.
| | | |
|---|---|---|
| C09D 11/02 | (2014.01) | |
| C09D 11/037 | (2014.01) | |
| C09C 1/64 | (2006.01) | |
| C09D 5/38 | (2006.01) | |
| C09D 11/322 | (2014.01) | |
| C09D 7/12 | (2006.01) | |
| C08F 222/10 | (2006.01) | |
| C08F 292/00 | (2006.01) | |

(52) U.S. Cl.
CPC ........ C09D 11/037 (2013.01); C08F 222/1006 (2013.01); C08F 292/00 (2013.01); C09C 1/644 (2013.01); C09C 1/646 (2013.01); C09C 1/648 (2013.01); C09D 5/38 (2013.01); C09D 7/1216 (2013.01); C09D 11/322 (2013.01); *C01P 2004/20* (2013.01); *C01P 2004/61* (2013.01); *Y10T 428/24901* (2015.01)

(58) Field of Classification Search
CPC ........ C09J 133/08; C09J 2433/00; C09J 4/00; C09J 7/0217; C09J 133/04; C09J 133/10; C09J 7/00; C09J 133/064; C09J 201/06; C09J 2400/263; C09J 155/005; C09J 175/16; C08L 2666/04; C08L 2205/02; C08L 33/00; C08L 33/02; C08L 33/04; C08L 33/06; C08L 33/08; C08L 2312/00; C08L 23/26; C08J 2207/02; C09D 5/006; C09D 7/1225; C09D 131/04; C09D 4/00; C09D 179/02; C09D 7/1241; C09D 11/322; C09D 11/037; C09D 5/38; C09C 1/644; C09C 1/648; C09C 1/646; C01P 2004/20; C01P 2004/61; C08F 2222/1006; C08F 2222/1026; C08F 220/06; C08F 212/36

See application file for complete search history.

(56) References Cited

U.S. PATENT DOCUMENTS

| | | | | | |
|---|---|---|---|---|---|
| 4,750,940 | A | * | 6/1988 | Higashi et al. | ................ 524/439 |
| 5,296,032 | A | * | 3/1994 | Jenkins et al. | ................ 106/404 |
| 5,348,579 | A | | 9/1994 | Jenkins et al. | |
| 5,356,469 | A | | 10/1994 | Jenkins et al. | |
| 5,637,143 | A | | 6/1997 | Jenkins et al. | |
| 7,767,018 | B2 | * | 8/2010 | Nakajima et al. | ............ 106/403 |
| 8,580,382 | B2 | * | 11/2013 | Sato et al. | .................... 428/403 |
| 8,871,833 | B2 | * | 10/2014 | Nakajima | ................ C09C 1/62 523/160 |
| 2001/0007696 | A1 | * | 7/2001 | Kaupp et al. | .................. 427/216 |
| 2006/0150864 | A1 | | 7/2006 | Hashizume et al. | |
| 2009/0117281 | A1 | * | 5/2009 | Sato et al. | ..................... 427/327 |
| 2009/0264575 | A1 | * | 10/2009 | Henglein et al. | ............. 524/441 |
| 2010/0058956 | A1 | * | 3/2010 | Nakajima et al. | ............ 106/404 |
| 2013/0011639 | A1 | | 1/2013 | Nakajima et al. | |
| 2013/0101813 | A1 | * | 4/2013 | Nakajima et al. | ............ 428/207 |

FOREIGN PATENT DOCUMENTS

| | | | |
|---|---|---|---|
| CN | 101287804 | | 10/2008 |
| CN | 101541891 | A | 9/2009 |
| JP | 08-502317 | | 3/1996 |
| JP | 10-130545 | | 5/1998 |
| JP | 2003-147226 | | 5/2003 |
| JP | 2008-120933 | | 5/2008 |
| JP | 2008-201821 | | 9/2008 |
| WO | 96/38506 | | 12/1996 |
| WO | 2004/096921 | | 11/2004 |
| WO | 2008/059839 | | 5/2008 |
| WO | WO 2008059839 | A1 * | 5/2008 |
| WO | WO 2011136215 | A1 * | 11/2011 ................ C09C 1/62 |

OTHER PUBLICATIONS https://en.wikipedia.org/wiki/Group_(periodic_table), May 2015.*
Chinese Office Action issued with respect to counterpart Chinese Application No. 201180028387.6, mail date Dec. 2, 2013.
U.S. Appl. No. 13/643,352 to Kazuko Nakajima et al., filed Oct. 25, 2012.
International Search Report from PCT/JP2011/602770, May 12, 2011.
International Preliminary Report on Patentability for PCT/JP2011/602770, Jul. 12, 2012.
Korean Office Action issued with respect to corresponding Korean Application No. 10-2012-7032132, mail date is Dec. 30, 2013.

* cited by examiner

*Primary Examiner* — Satya Sastri
(74) *Attorney, Agent, or Firm* — Greenblum & Bernstein, P.L.C.

(57) ABSTRACT

Disclosed is a metallic pigment composition which can provide, when used in a coating composition, an ink composition or the like, in particular, a water-based coating, a water-based ink or the like, a coating film having a high storage stability, a good adhesiveness, a good chemical resistance and a good color tone. Specifically disclosed is a metallic pigment composition which comprises at least one kind of compound selected from a heteropolyanion compound and a mixed-ligand heteropolyanion compound, an organic oligomer or polymer, and metal grains.

11 Claims, No Drawings

US 9,296,906 B2

METALLIC PIGMENT COMPOSITION

TECHNICAL FIELD

The present invention relates to a metallic pigment composition suitable for coating compositions, ink compositions or the like, in particular, water-based coatings, water-based inks or the like.

BACKGROUND ART

Conventionally, metallic pigments have been used for metallic coatings and printing inks, for kneading into plastic, and the like for the purpose of achieving a decorative effect with a focus on metallic feeling. In these applications, coating films obtained by using metallic pigments are often required to have adhesion and chemical resistance such as acid resistance or alkali resistance.

In the field of coatings, in view of resource saving and anti-pollution, there has been an increasing need for conversion to water-based coatings in which the amount of an organic solvent used is small, but there are still few examples of water-based coatings which are practicable in metallic coatings containing a metallic pigment. This is an extremely serious safety problem during production processes of coatings and inks in paint manufacturers and ink manufacturers as well as during processes of coatings and prints in automobile manufacturers, home appliance manufacturers and printing companies. The corrosion resistance of metallic pigments in water, water-based coatings or water-based inks is, hereinafter, referred to as "storage stability".

Patent Document 1 discloses a metallic pigment containing an amine salt of molybdic acid and covered with a three-dimensionally crosslinked resin in order to simultaneously achieve storage stability as well as adhesion and chemical resistance in water-based coatings or water-based inks. However, the method according to the patent document is insufficient in storage stability.

Patent Document 2 discloses a metallic pigment containing an amine salt of heteropolyacid. However, use of the metallic pigment obtained by the method according to the patent document does not achieve adhesion and chemical resistance such as acid resistance or alkali resistance in a coating film.

CITATION LIST

Patent Literature

Patent Document 1: JP 2008-201821 A
Patent Document 2: WO 2008/059839

SUMMARY OF INVENTION

Technical Problem

An object of the present invention is to provide a metallic pigment composition that has overcome the above disadvantages of the prior art, namely to provide a metallic pigment composition that can be used in coating compositions, ink compositions or the like, in particular, water-based coatings, water-based inks or the like, that is excellent in storage stability of coatings and further excellent in adhesion and chemical resistance when forming a coating film, and that causes small reductions in photoluminescence, hiding power, flip-flop feeling and the like when forming a coating film.

Solution to Problem

The present inventors have found that use of a metallic pigment composition containing a heteropolyanion compound or a mixed-coordination type heteropolyanion compound; an organic oligomer or polymer; and metallic particles makes it possible to obtain a metallic pigment composition simultaneously satisfying excellent storage stability as well as excellent adhesion, chemical resistance and color tone, thereby achieving the present invention.

Namely, the present invention is as follows.

(1) A metallic pigment composition containing metallic particles, an organic oligomer or polymer, and at least one compound selected from heteropolyanion compounds or mixed-coordination type heteropolyanion compounds.

(2) The metallic pigment composition according to (1), wherein the metallic particles are made of aluminum.

(3) The metallic pigment composition according to (1) or (2), wherein a heteroatom constituting the heteropolyanion compounds or mixed-coordination type heteropolyanion compounds is at least one selected from elements of Group 13, Group 14, and Group 15 in the periodic table.

(4) The metallic pigment composition according to (3), wherein the elements of Group 13, Group 14, and Group 15 in the periodic table are, respectively, B, Si and P.

(5) The metallic pigment composition according to any one of (1) to (4), wherein a polyatom constituting the heteropolyanion compounds or mixed-coordination type heteropolyanion compounds is selected from transition metals.

(6) The metallic pigment composition according to (5), wherein the transition metals are Ti, Zr, V, Nb, Mo and W.

(7) The metallic pigment composition according to (1) or (2), wherein the heteropolyanion compounds are at least one heteropolyacid selected from the group consisting of $H_3PMo_{12}O_{40} \cdot nH_2O$ (phosphomolybdic acid.n-hydrate), $H_3PW_{12}O_{40} \cdot nH_2O$ (phosphotungstic acid.n-hydrate), $H_4SiMo_{12}O_{40} \cdot nH_2O$ (silicomolybdic acid.n-hydrate) and $H_4SiW_{12}O_{40} \cdot nH_2O$ (silicotungstic acid.n-hydrate), wherein $n \geq 0$.

(8) The metallic pigment composition according to (1) or (2), wherein the mixed-coordination type heteropolyanion compounds are at least one mixed-coordination type heteropolyacid selected from the group consisting of $H_3PW_xMo_{12-x}O_{40} \cdot nH_2O$ (phosphotungstomolybdic acid.n hydrate), $H_{3+x}PV_xMo_{12-x}O_{40} \cdot nH_2O$ (phosphovanadomolybdic acid.n hydrate), $H_4SiW_xMo_{12-x}O_{40} \cdot nH_2O$ (silicotungstomolybdic acid.n hydrate) and $H_{4+x}SiV_xMo_{12-x}O_{40} \cdot nH_2O$ (silicovanadomolybdic acid.n hydrate), wherein $1 \leq x \leq 11$, $n \geq 0$.

(9) The metallic pigment composition according to any one of (1) to (6), wherein the heteropolyanion compounds are a salt of at least one selected from a heteropolyacid or mixed-coordination type heteropolyacid with at least one selected from alkali metals, alkaline earth metals, ammonia and amine compounds represented by the following general formula (1):

[Formula 1]

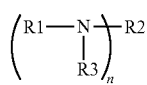

(1)

wherein R1, R2 and R3 may be the same or different, and are each a hydrogen atom, or a mono- or divalent hydrocarbon group having 1 to 30 carbon atoms that may optionally contain an ether bond, an ester bond, a hydroxyl group, a carbonyl group, and a thiol group, wherein R1 and R2 are optionally taken together to form a 5-membered or 6-membered cycloalkyl group, R1 and R2 are optionally taken together with a nitrogen atom to form a 5-membered or 6-membered ring that is capable of additionally containing a nitrogen or oxygen atom as a crosslinking member, or R1, R2 and R3 are optionally taken together to form a multi-membered multiring composition that is capable of containing one or more additional nitrogen atoms and/or oxygen atoms as a crosslinking member, R1, R2 and R3 are not a hydrogen atom at the same time; and n represents a numerical value of 1 to 2.

(10) The metallic pigment composition according to (9), wherein the heteropolyacid is the heteropolyacid according to (7).

(11) The metallic pigment composition according to (9), wherein the mixed-coordination type heteropolyacid is the mixed-coordination type heteropolyacid according to (8).

(12) The metallic pigment composition according to any one of (1) to (11), wherein the organic oligomer or polymer is an organic oligomer or polymer having interaction with at least one of the metallic particles, and the heteropolyanion compound or mixed-coordination type heteropolyanion compound, which coexists.

(13) The metallic pigment composition according to (12), wherein the organic oligomer or polymer is an acrylic polymer containing, as polymerization components, one or more monomers which can interact with at least one of the metallic particles, and the heteropolyanion compound or mixed-coordination type heteropolyanion compound, which coexist; and one or more monomers which can have a crosslinked structure.

(14) The metallic pigment composition according to any one of (1) to (13), wherein at least one compound selected from the heteropolyanion compounds or mixed-coordination type heteropolyanion compounds is present in an amount of 0.01 to 10 parts by weight based on 100 parts by weight of the metallic particles.

(15) The metallic pigment composition according to any one of (1) to (14), wherein the organic oligomer or polymer is present in an amount of 0.01 to 50 parts by weight based on 100 parts by weight of the metallic particles.

(16) A method for producing a metallic pigment composition according to any one of (1) to (15), comprising mixing metallic particles with at least one compound selected from the heteropolyanion compounds or mixed-coordination type heteropolyanion compounds in the presence of a solvent arbitrarily containing water, and then polymerizing or mixing an organic oligomer or polymer.

(17) A coating composition comprising the metallic pigment composition according to any one of (1) to (15), a coating film formed by the coating composition, or an article being coated with the coating composition.

(18) An ink composition comprising a metallic pigment composition according to any one of (1) to (15), or a printed material formed by the ink composition.

Advantageous Effects of Invention

In the case where the metallic pigment composition of the present invention is used in coating compositions, ink compositions or the like, in particular water-based coatings, water-based inks or the like, a coating film that has high storage stability, and further is excellent in adhesiveness, chemical resistance and color tone can be obtained.

DESCRIPTION OF EMBODIMENTS

Hereinafter, the present invention will be described in detail with reference to, in particular, preferable aspects of the present invention.

As metallic particles for use in the present invention, particles of base metals such as aluminum, zinc, iron, magnesium, copper and nickel, and particles of alloys thereof can be preferably used.

With respect to the shape thereof, the average particle diameter (d50) is 2 to 40 μm, the average thickness (t) is preferably in a range of 0.001 to 10 μm and further preferably in a range of 0.01 to 10 μm, and the average aspect ratio is preferably in a range of about 1 to 6000. Herein, the average aspect ratio means a value obtained by dividing the average particle diameter (d50) of the metallic particles by the average thickness (t).

In the case where the metallic particles are used as a pigment, scale-like particles are preferable.

Particularly suitable are aluminum flakes frequently used as a pigment for metallic coatings. As aluminum flakes for use in the present invention, suitable are those having surface texture, particle diameter and shape which are demanded for the pigment for metallic coatings, such as surface glossiness, whiteness and photoluminescence.

Aluminum flakes are usually commercially available in the state of a paste, and may be used as they are or may be used after fatty acid and the like on the surface thereof are removed in advance by an organic solvent and the like. So-called aluminum-deposited foils can also be used in which the average particle diameter (d50) is 3 to 30 μm and the average thickness (t) is 5 to 50 nm.

The heteropolyanion compounds or mixed-coordination type heteropolyanion compounds for use in the present invention are formed from one or more of elements of Group 13, Group 14, and Group 15 in the periodic table (i.e. long form periodic table), and one or two transition metal elements. The heteropolyanion is an oxoacid anion containing two or more central ions, is represented by a chemical formula, $[X_pM_qO_s]^t$ or $[X_pM_qN_rO_s]^t$, and is distinguished from an isopolyanion $[M_qO_s]^t$ containing one central ion (wherein X represents a heteroatom, and M and N represent a polyatom, respectively. In addition, each of p, q, r and s represents the number of atoms, and t represents an oxidation number.)

In particular, the heteropolyanion or the mixed-coordination type heteropolyanion has a stronger acid strength and a stronger oxidation power than the isopolyanion, and thus it is apparent that properties of the heteropolyanion and mixed-coordination type heteropolyanion are different from those of the isopolyanion.

It is found that most of elements in the periodic table can serve as the heteroatom X of the heteropolyanion, and elements of Group 13, Group 14, and Group 15, such as B, Si, Ge, P and As, are preferable and B, Si and P are more preferable.

Regarding the polyatoms M and N, transition metals such as Ti, Zr, V, Nb, Ta, Mo and W are preferable and transition metals such as Ti, Zr, V, Nb, Mo and W are more preferable.

Taking one of the most general structures of the heteropolyanion as an example, a heteropolyanion containing one transition metal element is usually represented by $[X^{a+}M^{b+}_{12}O^{2-}_{40}]^{(a+12b-80)}$. The mixed-coordination type heteropolyanion containing two transition metals is represented by $[X^{a+}M^{b+}_xN^{c+}_{12-x}O^{2-}_{40}]^{\{a+bx+c(12-x)-80\}}$, and the physical properties of it are different from those of a mixture of $[X^{a+}M^{b+}_{12}O^{2-}_{40}]^{(a+12b-80)}$ and $[X^{a+}N^{c+}_{12}O^{2-}_{40}]^{(a+12c-80)}$ wherein X represents any of elements of Group 13, Group 14, and Group 15, such as B, Si, Ge, P, and As, and each of M and N represents a transition metal such as Ti, Zr, V, Nb, Ta, Mo, and W. In addition, each of a, b and c represents the oxidation number of an atom, and $1 \leq x \leq 11$).

The heteropolyanion compounds can have a large number of structures, representative examples of the heteropolyanion compound include heteropolyacids such as $H_3PMo_{12}O_{40}\cdot nH_2O$ (phosphomolybdic acid.n-hydrate), $H_3PW_{12}O_{40}\cdot nH_2O$ (phosphotungstic acid.n-hydrate), $H_4SiMo_{12}O_{40}\cdot nH_2O$ (silicomolybdic acid.n-hydrate) and $H_4SiW_{12}O_{40}\cdot nH_2O$ (silicotungstic acid.n-hydrate), and these are preferably used (wherein $n\geq 0$).

Examples of the mixed-coordination type heteropolyanion compounds include mixed-coordination type heteropolyacids such as $H_3PW_xMo_{12}O_{40}\cdot nH_2O$ (phosphotungstomolybdic acid.n-hydrate), $H_{3+x}PV_xMo_{12-x}O_{40}\cdot nH_2O$ (phosphovanadomolybdic acid.n-hydrate), $H_4SiW_xMo_{12-x}O_{40}\cdot nH_2O$ (silicotungstomolybdic acid.n-hydrate) and $H_{4+x}SiV_xMo_{12-x}O_{40}\cdot nH_2O$ (silicovanadomolybdic acid.n-hydrate) (wherein $1\leq x \leq 11$, and $n\geq 0$).

Among these mixed-coordination type heteropolyanion compounds, preferable examples include $H_3PW_3Mo_9O_{40}\cdot nH_2O$, $H_3PW_6Mo_6O_{40}\cdot nH_2O$, $H_3PW_9Mo_3O_{40}\cdot nH_2O$, $H_4PV_1Mo_{11}O_{40}\cdot nH_2O$, $H_6PV_3Mo_9O_{40}\cdot nH_2O$, $H_4SiW_3Mo_9O_{40}\cdot nH_2O$, $H_4SiW_6Mo_6O_{40}\cdot nH_2O$, $H_4SiW_9Mo_3O_{40}\cdot nH_2O$, $H_5SiV_1Mo_{11}O_{40}\cdot nH_2O$ and $H_7SiV_3Mo_9O_{40}\cdot nH_2O$ (wherein $n\geq 0$).

The heteropolyanion compounds or the mixed-coordination type heteropolyanion compounds may be used in the form of an acid (namely, heteropolyacid or mixed-coordination type heteropolyacid), or may be used in the form of a (partial or complete) salt in which a specified cation serves as a counterion.

Examples of a countercation source in the case of using in the form of a salt include at least one selected from inorganic components such as alkali metals including lithium, sodium, potassium, rubidium and cesium; alkaline earth metals including magnesium, calcium, strontium and barium; metals including manganese, iron, cobalt, nickel, copper, zinc, silver, cadmium, lead and aluminum; and ammonia; organic components such as amine compounds; and the like. Among them, alkali metals, earth metals, ammonia and amine compounds are preferable.

The amine compounds are preferably those represented by the following general formula (1).

[Formula 2]

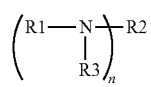

(1)

(wherein R1, R2 and R3 may be the same or different, and are each a hydrogen atom, or a mono- or divalent hydrocarbon group having 1 to 30 carbon atoms that may optionally contain an ether bond, an ester bond, a hydroxyl group, a carbonyl group, and a thiol group, wherein R1 and R2 are optionally taken together to form a 5-membered or 6-membered cycloalkyl group, R1 and R2 are optionally taken together with a nitrogen atom to form a 5-membered or 6-membered ring that is capable of additionally containing a nitrogen or oxygen atom as a crosslinking member, or R1, R2 and R3 are optionally taken together to form a multi-membered multiring composition that is capable of containing one or more additional nitrogen atoms and/or oxygen atoms as a crosslinking member. R1, R2 and R3 are not a hydrogen atom at the same time. n represents a numerical value of 1 to 2.)

Specific examples include straight primary amines such as ethylamine, propylamine, butylamine, hexylamine, octylamine, laurylamine, tridecylamine and stearylamine; branched primary amines such as isopropylamine, isobutylamine, 2-ethylhexylamine and branched tridecylamine; straight secondary amines such as dimethylamine, diethylamine, dipropylamine, dibutylamine, dihexylamine, dioctylamine, dilaurylamine, ditridecylamine and distearylamine; branched secondary amines such as diisopropylamine, diisobutylamine, di-2-ethylhexylamine and dibranched tridecylamine; asymmetric secondary amines such as N-methylbutylamine, N-ethylbutylamine, N-ethylhexylamine, N-ethyllaurylamine, N-ethylstearylamine, N-isopropyloctylamine and N-isobutyl-2-ethylhexylamine; straight tertiary amines such as trimethylamine, triethylamine, tripropylamine, tributylamine, trioctylamine, trilaurylamine, tritridecylamine and tristearylamine; branched tertiary amines such as triisopropylamine, triisobutylamine, tri-2-ethylhexylamine and tribranched tridecylamine; tertiary amines having a mixed hydrocarbon group, such as N,N-dimethyloctylamine, N,N-dimethyllaurylamine, N,N-dimethylstearylamine and N,N-diethyllaurylamine; and additionally, amines having an alkenyl group, such as allylamine, diallylamine, triallylamine and N,N-dimethylallylamine; and alicyclic primary amines such as cyclohexylamine and 2-methylcyclohexylamine; primary amines having an aromatic ring substituent, such as aniline, benzylamine and 4-methylbenzylamine; alicyclic secondary amines such as N,N-dicyclohexylamine and N,N-di-2-methylcyclohexylamine; secondary amines having an aromatic ring substituent, such as dibenzylamine and N,N-di-4-methylbenzylamine; asymmetric secondary amines such as N-cyclohexyl-2-ethylhexylamine, N-cyclohexylbenzylamine, N-stearylbenzylamine and N-2-ethylhexylbenzylamine; alicyclic tertiary amines such as N,N-dimethylbenzylamine, N,N-dimethylcyclohexylamine and tricyclohexylamine; tertiary amines having an aromatic ring substituent, such as tribenzylamine and tri-4-methylbenzylamine; amines having ether bonds such as morpholine, 3-methoxypropylamine, 3-ethoxypropylamine, 3-butoxypropylamine, 3-decyloxypropylamine, and 3-lauryloxypropylamine; alkanolamines such as monoethanolamine, diethanolamine, monoisopropanolamine, monopropanolamine, butanolamine, triethanolamine, N,N-dimethylethanolamine, N-methylethanolamine, N-methyldiethanolamine, N-ethylethanolamine, N-propylethanolamine, N-isopropylethanolamine, N-butylethanolamine, N-cyclohexyl-N-methylaminoethanol, N-benzyl-N-propylaminoethanol, or N-hydroxyethylpyrrolidine, N-hydroxyethylpiperazine, and N-hydroxyethylmorpholine; diamines such as ethylenediamine, N-methylethylenediamine, N,N'-dimethylethylenediamine, N,N,N',N'-tetramethylethylenediamine, 1,2-propanediamine, 1,3-propanediamine, N,N-dimethyl-1,3-propanediamine, N-cyclohexyl-1,3-propanediamine, N-decyl-1,3-propanediamine, and N-isotridecyl-1,3-propanediamine; cyclic amines such as N,N-dimethylpiperazine, N-methoxyphenylpiperazine, N-methylpiperidine, N-ethylpiperidine, quinuclidine, diazabicyclo[2,2,2]octane, and 1,8-diazabicyclo[5,4,0]-7-undecene; aromatic amines such as pyridine and quinoline; and the like; or mixtures thereof.

Among them, preferable examples include at least one selected from primary, secondary, or tertiary amines of straight or branched alkyl having 4 to 20 carbon atoms, or alkanolamines, and specific examples include butylamine, hexylamine, cyclohexylamine, octylamine, tridecylamine, stearylamine, dihexylamine, di-2-ethylhexylamine, straight or branched ditridecylamine, distearylamine, tributylamine, trioctylamine, straight or branched tritridecylamine, tristearylamine, N,N-dimethylethanolamine, N-methyldiethanolamine, triethanolamine, and morpholine.

At least one compound selected from the heteropolyanion compounds or the mixed-coordination type heteropolyanion compounds is added in an amount of 0.01 to 10 parts by weight, and preferably 0.01 to 5 parts by weight, based on 100 parts by weight of the metallic particles.

At least one compound selected from the heteropolyanion compounds or the mixed-coordination type heteropolyanion compounds for use in the present invention may be added at the time of pulverizing or extending a raw material metal powder by a ball mill, may be mixed in a slurry in which a solvent is added to the metallic particles, or may be kneaded in a paste having a reduced amount of a solvent.

At least one compound selected from the heteropolyanion compounds or the mixed-coordination type heteropolyanion compounds may also be added to the metallic particles as it is, or may also be diluted by a solvent and added. In order to achieve a uniformly mixed state, the at least one compound is preferably diluted by a solvent in advance and added. The solvent for use in dilution may arbitrarily contain water as long as it can achieve such dilution.

Examples of the solvent used in dilution include water, alcohols such as methanol, ethanol, propanol, butanol, isopropanol, and octanol; ether-alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether, and dipropylene glycol monomethyl ether; and glycols such as ethylene glycol, propylene glycol, 1,3-butanediol, 1,4-butanediol, polyoxyethylene glycol, polyoxypropylene glycol, and ethylene propylene glycol. The solvent may be dissolved by an acid or alkali, and added.

The organic oligomer or polymer contained in the present invention preferably has interaction with at least one of the metallic particles, and the heteropolyanion compound or the mixed-coordination type heteropolyanion compound, which coexist, and an acrylic resin and/or a polyester resin having the above property are/is preferably used.

In particular, the acrylic resin is preferably a polymer containing, as one of the components, at least one of monomers which can interact with at least one of the metallic particles, and the heteropolyanion compound or the mixed-coordination type heteropolyanion compound, which coexist, and at least one selected from the group consisting of monomers which can have a crosslinked structure. In that case, other monomers may be used in combination.

The organic oligomer or polymer is added in an amount of 0.01 to 50 parts by weight based on 100 parts by weight of the metallic particles.

The monomers which can interact with at least one of the metallic particles, and the heteropolyanion compound or the mixed-coordination type heteropolyanion compound, which coexist, are preferably at least one selected from the group consisting of, for example, radical and/or ionic polymerizable unsaturated carboxylic acid; phosphoric acid or phosphonic acid ester having a radical and/or ionic polymerizable double bond; a compound having a radical and/or ionic polymerizable double bond and an isocyanate group; a compound having a radical and/or ionic polymerizable double bond and an epoxy group; a compound having a radical and/or ionic polymerizable double bond and an amino group; a compound having a radical and/or ionic polymerizable double bond and a hydrolyzable silyl group; a compound having a radical and/or ionic polymerizable double bond and a sulfone group; and a compound having a radical and/or ionic polymerizable double bond and a hydroxyl group.

Examples of the radical and/or ionic polymerizable unsaturated carboxylic acid include acrylic acid, methacrylic acid, itaconic acid, crotonic acid, citraconic acid, fumaric acid, maleic acid, maleic anhydride, monomethyl maleate, monoethyl maleate, monooctyl maleate, monomethyl fumarate, monoethyl fumarate, monooctyl fumarate, β-carboxyethyl (meth)acrylate, 2-(meth)acryloyloxyethylhexahydrophthalic acid, 2-(meth)acryloyloxypropylhexahydrophthalic acid, 2-methacroyloxyethylsuccinic acid, 2-methacroyloxyethylmaleic acid, 2-(meth)acryloyloxyethylphthalic acid, 2-(meth)acryloyloxypropylphthalic acid, myristoleic acid, oleic acid, eicosadienoic acid and docosadienoic acid.

Among them, acrylic acid, methacrylic acid, itaconic acid, fumaric acid, maleic acid, maleic anhydride, and the like are preferably used.

As the phosphoric acid or phosphonic acid ester having a radical and/or ionic polymerizable double bond, a mono- or diester of phosphoric acid or phosphonic acid is used. Among them, a mono- or diester of phosphoric acid is preferably used, and such a compound is represented by the following general formula (2):

[Formula 3]

(wherein R4, R5 and R6 may be the same or different, and are each a hydrogen atom, a hydrocarbon group having 1 to 30 carbon atoms that may optionally contain an ether group, an ester group, a hydroxyl group, a carbonyl group, and a halogen group, a hydrocarbon group that may optionally contain a ring structure or an unsaturated bond, or a group represented by the following general formula (3), wherein one or two of R4, R5 and R6 are a hydrogen atom, one or two thereof are the following general formula (9), and the total number of carbon atoms of R4, R5 and R6 is 4 or more. m represents a numerical value of 0 or 1.)

[Formula 4]

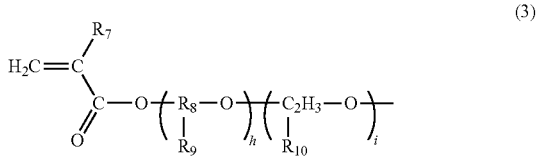

(wherein R7 and R10 represent a hydrogen atom or a methyl group, R8 is a trivalent organic group having 2 to 8 carbon atoms that may optionally contain an oxygen atom, R9 represents a hydrogen atom or the following general formula (4). h represents a numerical value of 0 or 1 and i represents a numerical value of 0 to 10.)

[Formula 5]

(wherein X represents a hydrogen atom or a chlorine atom).

Specific examples thereof include 2-(meth)acryloyloxyethyl acid phosphate, di-2-(meth)acryloyloxyethyl acid phosphate, tri-2-(meth)acryloyloxyethyl phosphate and any mixtures thereof; 2-(meth)acryloyloxypropyl acid phosphate, di-2-(meth)acryloyloxypropyl acid phosphate, tri-2-(meth)acryloyloxypropyl phosphate and any mixtures thereof; phenyl-2-(meth)acryloyloxyethyl acid phosphate, butyl-2-(meth)acryloyloxyethyl acid phosphate, octyl-2-(meth)acryloyloxyethyl acid phosphate, bis(2-chloroethyl)vinyl phosphonate, 3-chloro-2-acid phosphoxypropyl(meth)acrylate, acid phosphoxy-polyoxyethylene glycol mono(meth)acrylate and acid phosphoxy-polyoxypropylene glycol mono(meth)acrylate. These can also be optionally used in the form of a salt with an inorganic base or an organic amine. The organic amine used herein is represented by the following general formula (5):

[Formula 6]

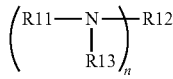

(5)

(wherein R11, R12 and R13 may be the same or different, are each a hydrogen atom, or a mono- or divalent hydrocarbon group having 1 to 30 carbon atoms that may optionally contain an ether bond, an ester bond, a hydroxyl group, a carbonyl group, and a thiol group, R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multiring that is capable of containing one or more additional nitrogen atoms and/or oxygen atoms as a crosslinking members. R11, R12 and R13 are not a hydrogen atom at the same time. n represents a numerical value of 1 to 2.)

Among them, 2-(meth)acryloyloxyethyl acid phosphate, di-2-(meth)acryloyloxyethyl acid phosphate, tri-2-(meth)acryloyloxyethyl phosphate and any mixtures thereof; 2-(meth)acryloyloxypropyl acid phosphate, di-2-(meth)acryloyloxypropyl acid phosphate, tri-2-(meth)acryloyloxypropyl phosphate and any mixtures thereof; and organic amine salts thereof, and the like, in particular, ethanolamine salts and morpholine salts are preferable.

In the present application, "(meth)acrylate" means acrylate or methacrylate unless specifically stated otherwise.

Examples of the compound having a radical and/or ionic polymerizable double bond and an isocyanate group include 2-isocyanatoethyl(meth)acrylate and 2-isocyanatoethoxyethyl (meth)acrylate, and these are preferably used.

Examples of the compound having a radical and/or ionic polymerizable double bond and an epoxy group include glycidyl(meth)acrylate, methylglycidyl(meth)acrylate, 3,4-epoxycyclohexylmethyl(meth)acrylate, epoxylated polybutadiene, and the like, and these are preferably used.

Examples of the compound having a radical and/or ionic polymerizable double bond and an amino group include aminoethyl(meth)acrylate, dimethylaminoethyl(meth)acrylate, diethylaminoethyl(meth)acrylate, morpholinoethyl(meth)acrylate, N,N-dimethylaminoethyl (meth)acrylamide, 2-aminoethyl vinyl ether, 2-dimethylaminoethyl vinyl ether, N,N-dimethylaminopropyl(meth)acrylamide, aminostyrene, N,N-dimethylaminostyrene, vinylbenzylamine and allylamine.

Among them, aminoethyl(meth)acrylate, dimethylaminoethyl(meth)acrylate, diethylaminoethyl(meth)acrylate, allylamine, and the like are preferably used.

Examples of the compound having a radical and/or ionic polymerizable double bond and a hydrolyzable silyl group include (meth)acryloyloxypropyltrimethoxysilane, (meth)acryloyloxypropyltriethoxysilane, (meth)acryloyloxypropylmethyldimethoxysilane, (meth)acryloyloxypropylmethyldiethoxysilane, (meth)acryloyloxyethoxypropyltrimethoxysilane, (meth)acryloyloxymethyldimethylsilanol, vinyltrimethoxysilane and vinyltriethoxysilane.

Among them, (meth)acryloyloxypropyltrimethoxysilane, (meth)acryloyloxypropyltriethoxysilane, and the like are preferably used.

Examples of the compound having a radical and/or ionic polymerizable double bond and a sulfone group include p-styrenesulfonic acid, allylsulfosuccinic acid and 3-sulfopropyl(meth)acrylate, and these are preferably used.

Examples of the compound having a radical and/or ionic polymerizable double bond and a hydroxyl group include (meth)acrylic acid esters having activated hydrogen, such as 2-hydroxyethyl(meth)acrylate, 2-hydroxypropyl(meth)acrylate, 2-hydroxybutyl(meth)acrylate, 3-hydroxypropyl(meth)acrylate, 4-hydroxybutyl(meth)acrylate, 2-hydroxy-3-chloropropyl(meth)acrylate, 2-hydroxy-3-phenoxypropyl(meth)acrylate, (4-hydroxymethylcyclohexyl)(meth)acrylate, 2-(meth)acryloyloxyethyl-2-hydroxyethylphthalate, polyethylene glycol mono(meth)acrylate, polypropylene glycol mono(meth)acrylate, caprolactone modified hydroxyethyl (meth)acrylate, glycerol mono(meth)acrylate and trimethylolpropane mono(meth)acrylate; hydroxyalkyl vinyl ethers such as 2-hydroxyethyl vinyl ether, 4-hydroxybutyl vinyl ether and hydroxycyclohexyl vinyl ether; unsaturated alcohols such as butene-1-ol-3,2-methylbutene-3-ol-2,3-methylbutene-3-ol-1 and 3-methylbutene-2-ol-1; and N-methylol (meth)acrylamide.

Among them, 2-hydroxyethyl(meth)acrylate, 2-hydroxypropyl(meth)acrylate, and the like are preferably used.

These monomers which can interact with at least one of the metallic particles, and the heteropolyanion compound or the mixed-coordination type heteropolyanion compound, which co-exist, may be used solely, or two or more thereof may be mixed for use.

With respect to the amount used, the monomers are generally added in an amount of 0.01 to 30 parts by weight, and preferably 0.1 to 20 parts by weight, based on 100 parts by weight of the metallic particles.

As the monomers which can have a crosslinked structure, a monomer having at least two radical and/or ionic polymerizable double bonds in one molecule is preferable.

Examples of a monomer having two radical and/or ionic polymerizable double bonds in one molecule include ethyleneglycol di(meth)acrylate, 1,4-butanediol di(meth)acrylate, 1,6-hexanediol di(meth)acrylate, 1,9-nonanediol di(meth)acrylate, 1,6-hexanediol diglycidylether di(meth)acrylate, neopentyl glycol di(meth)acrylate, glycerin di(meth)acrylate, di(meth)acrylate of neopentyl glycol propyleneoxide adduct, diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, polytetramethylene glycol di(meth)acrylate, hydroxypivalic acid neopentyl glycol ester di(meth)acrylate, di(meth)acrylate of bisphenol A ethyleneoxide adduct, di(meth)acrylate of hydrogenated bisphenol A propyleneoxide adduct, dimethylol tricyclodecane di(meth)acrylate, glycerin methacrylate acrylate, divinylbenzene, vinyl adipate, vinyl(meth)acrylate, vinyl crotonate, vinyl cinnamate, allyl vinyl ether, isopropenyl vinyl ether, and the like.

Examples of a monomer having three or more radical and/or ionic polymerizable double bonds in one molecule include trimethylolpropane tri(meth)acrylate, tri(meth)acrylate of glycerin ethylene oxide adduct, tri(meth)acrylate of trimethylolpropane propylene oxide adduct, ditrimethylolpropane tetra(meth)acrylate, pentaerythritol tetra(meth)acrylate, dipentaerythritol penta(meth)acrylate, dipentaerythritol hexa(meth)acrylate, hexa(meth)acrylate of dipentaerythritol caprolactone adduct, dipentaerythritol tri(meth)acrylate tripropionate and dipentaerythritol hexa(meth)acrylate monopropionate, and the like.

These monomers which can have a crosslinked structure may be used solely, or two or more thereof may be mixed for use.

With respect to the amount used, the monomers are generally added in an amount of 0.01 to 50 parts by weight, and preferably 1 to 30 parts by weight, based on 100 parts by weight of the metallic particles.

In addition to the monomers which can interact with at least one of the metallic particles, and the heteropolyanion compound or the mixed-coordination type heteropolyanion compound, which coexist, and the monomers which can have a crosslinked structure, any other monomers can also be copolymerized.

Examples of other monomers which can also be copolymerized include (meth)acrylic acid esters such as methyl (meth)acrylate, ethyl(meth)acrylate, isopropyl(meth)acrylate, n-butyl(meth)acrylate, hexyl(meth)acrylate, cyclohexyl (meth)acrylate, 2-ethylhexyl(meth)acrylate, lauryl(meth) acrylate, benzyl(meth)acrylate, isobornyl(meth)acrylate, dicyclopentenyl (meth)acrylate and furfuryl(meth)acrylate; (meth)acrylic acid esters having a fluorine-containing side chain such as trifluoroethyl(meth)acrylate, 2,2,3,3-tetrafluoropropyl(meth)acrylate and perfluorooctylethyl(meth)acrylate; unsaturated amides such as (meth)acrylamide, N,N-dimethyl(meth)acrylamide, N-isopropyl(meth)acrylamide, (meth)acryloyl morpholine and diacetone(meth)acrylamide; vinyl esters such as vinyl acetate, vinyl propionate, vinyl pivalate, vinyl caprate, vinyl stearate and vinyl benzoate; vinyl ethers such as methyl vinyl ether, ethyl vinyl ether, butyl vinyl ether, cyclohexyl vinyl ether, 2-ethylhexyl vinyl ether and lauryl vinyl ether; fluorinated olefins such as tetrafluoroethylene, chlorotrifluoroethylene, hexafluoropropylene and perfluoropentene-1; styrene, α-methylstyrene, vinyltoluene, (meth)acrylonitrile, dibutyl fumarate, and the like.

Furthermore, monomers having a condensed polycyclic hydrocarbon skeleton, such as pentalene, indene, naphthalene, azulene, heptalene, biphenylene, indacene, fluorene, 9,9-bisphenylfluorene, phenanthrene, anthracene, triphenylene, pyrene and perylene, and monomers having a condensed heterocyclic skeleton, such as indole, quinoline, indolizine, carbazole, acridine and phenoxazine can also be used. Specific examples thereof include vinylnaphthalene, divinylnaphthalene, vinylanthracene, divinylanthracene, N-vinylcarbazole, N-acryloylcarbazole, divinylfluorene, 9,9-bis[4-((meth)acryloyloxyethoxy)phenyl]fluorene and 9,9-bis [4-((meth)acryloyloxy-2(or 1)methylethoxy)phenyl]fluorene.

All the above monomers may be used solely, or two or more thereof may be mixed for use.

The amount used is, for example, generally in the order of 0 to 30 parts by weight based on 100 parts by weight of the metallic particles.

These (meth)acrylic monomers are polymerized by any known method such as radical polymerization and ionic polymerization, and usually simply polymerized by a radical polymerization method using a polymerization initiator.

Examples of the radical polymerization initiator include peroxides such as benzoyl peroxide, lauroyl peroxide and bis-(4-t-butylcyclohexyl)peroxydicarbonate; and azo compounds such as 2,2'-azobis-isobutyronitrile and 2,2'-azobis-2,4-dimethylvaleronitrile.

The amount used is not particularly limited, and usually in the order of 0.1 to 20 parts by weight based on 100 parts by weight of a monomer having a radical polymerizable double bond.

Polymerization is performed in a slurry, in which the solvent is added to the metallic particles, by adding the monomer and the polymerization initiator simultaneously or separately at once, simultaneously or separately in portions, or simultaneously or separately in series.

In particular, a method of adding the monomer and the polymerization initiator separately in portions or in series is preferably used.

The monomer and the polymerization initiator may be added at the same time as adding at least one compound selected from the heteropolyanion compound and the mixed-coordination type heteropolyanion compound to the metallic particles, but may be preferably added in a different kind of solvent if necessary, after adding at least one compound selected from the heteropolyanion compound and the mixed-coordination type heteropolyanion compound, thereby performing polymerization.

The solvent at the time of adding and polymerization reaction may be a hydrophobic solvent or a hydrophilic solvent. Examples of the hydrophobic solvent include mineral spirit, solvent naphtha, LAWS (Low Aromatic White Spirit), HAWS (High Aromatic White Spirit), toluene, xylene, esters such as ethyl acetate and butyl acetate, and ketones such as methyl ethyl ketone, methyl isobutyl ketone and cyclohexanone. Examples of the hydrophilic solvent that can be used include alcohols such as methanol, ethanol, propanol, butanol, isopropanol and octanol, ether alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether, glycols such as propylene glycol, polyoxyethylene glycol, polyoxypropylene glycol and ethylene propylene glycol, and the like. These can be used solely or used as a mixture thereof.

Solvents having a relatively low polarity, for example, mineral spirit, solvent naphtha, LAWS, HAWS, toluene, xylene, butyl acetate, methyl isobutyl ketone, cyclohexanone, octanol, and ether alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether are more preferably exemplified.

The polymerization reaction in the slurry is performed with the concentration of the metallic particles in the slurry being preferably 5 to 20% by weight. The polymerization temperature and time are appropriately determined depending on the progression of the reaction, and usually the temperature is about 0° C. to 150° C. and the time is about 0.5 to 48 hours.

Examples of the polyester resins include polyester resins obtained by a condensation reaction of one or a mixture selected from the group of carboxylic acids such as succinic acid, adipic acid, sebacic acid, dimer acid, maleic anhydride, phthalic anhydride, isophthalic acid, terephthalic acid, trimellitic acid and pyromellitic acid, with one or a mixture of polyhydric alcohols selected from the group of the following: diols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 2,5-hexanediol, 2-methyl-2,4-pentanediol, 2-ethyl-hexanediol, 1,2-octanediol, 1,2-decanediol, 2,2,4-trimethylpentanediol, 2-butyl-2-ethyl-1,3-propanediol and 2,2-diethyl-1,3-propanediol; triols such as glycerin and trimethylolpropane; and tetraols such as diglycerin, dimethylolpropane and pentaerythritol.

With respect to the amount used, the polyester resin is generally added in an amount of 0.01 to 50 parts by weight, and preferably 1 to 30 parts by weight based on 100 parts by weight of the metallic particles.

The organic oligomer or polymer for use in the present invention may be obtained by starting polycondensation at the same time as or after adding at least one compound selected from the heteropolyanion compound and the mixed-coordination type heteropolyanion compound to the metallic particles, or may be added in advance in the state of oligomer or polymer, but is preferably obtained by performing polycondensation.

The solvent for use in preparation of the metallic pigment composition of the present invention may be a hydrophobic solvent or a hydrophilic solvent. Examples of the hydrophobic solvent include mineral spirit, solvent naphtha, LAWS (Low Aromatic White Spirit), HAWS (High Aromatic White Spirit), toluene, xylene, esters such as ethyl acetate and butyl acetate, and ketones such as methyl ethyl ketone, methyl isobutyl ketone and cyclohexanone. Examples of the hydrophilic solvent that can be used include alcohols such as methanol, ethanol, propanol, butanol, isopropanol and octanol, ether alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether, and glycols such as propylene glycol, polyoxyethylene glycol, polyoxypropylene glycol and ethylene propylene glycol. These can be used solely or used as a mixture thereof.

Solvents having a relatively low polarity, for example, mineral spirit, solvent naphtha, LAWS, HAWS, toluene, xylene, butyl acetate, methyl isobutyl ketone, cyclohexanone, octanol, and ether alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether are more preferably exemplified.

In the case of the preparation in a slurry, the concentration of the metallic particles in the slurry is 1 to 50% by weight and preferably 5 to 30% by weight, and in the case of the kneading in a paste, the concentration of the metallic particles is 50 to 95% by weight and preferably 60 to 85% by weight.

The metallic pigment composition of the invention of the present application can further contain one or more phosphoric acid compounds selected from the group consisting of (i) inorganic phosphoric acids or salts thereof and (ii) acidic organic phosphoric or phosphorous acid esters or salts thereof, in addition to at least one compound selected from the heteropolyanion compounds or the mixed-coordination type heteropolyanion compounds and the organic oligomer or polymer, which coexist with the metallic particles. Herein, in the present application, the acidic organic phosphoric or phosphorous acid esters mean acidic organic phosphoric acid esters or acidic organic phosphorous acid esters, unless specifically stated otherwise.

Examples of the inorganic phosphoric acids described in (i) include orthophosphoric acid, pyrophosphoric acid, metaphosphoric acid, triphosphoric acid, tetraphosphoric acid, phosphorous acid, polyphosphoric acid, laurylphosphoric acid, polyoxypropylene oleylether phosphoric acid and dipolyoxyethylene nonylphenylether phosphoric acid. Among them, orthophosphoric acid, pyrophosphoric acid, metaphosphoric acid, triphosphoric acid, tetraphosphoric acid and phosphorous acid are particularly preferable.

The acidic organic phosphoric or phosphorous acid esters described in (ii) are represented by the following general formula (6) or (7):

[Formula 7]

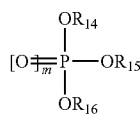

(6)

(wherein R14, R15 and R16 may be the same or different, and are each a hydrogen atom, a hydrocarbon group having 1 to 30 carbon atoms that may optionally contain an ether group, an ester group, a hydroxyl group, a carbonyl group, and a halogen group, or a hydrocarbon group that may optionally contain a ring structure or an unsaturated bond, wherein one or two of R14, R15 and R16 are a hydrogen atom and the total number of carbon atoms of R14, R15 and R16 is 4 or more. m represents a numerical value of 0 or 1.)

[Formula 8]

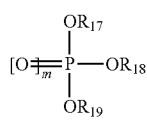

(7)

(wherein R17, R18 and R19 may be the same or different, and are each a hydrogen atom, a hydrocarbon group having 1 to 30 carbon atoms that may optionally contain an ether group, an ester group, a hydroxyl group, a carbonyl group, and a halogen group, a hydrocarbon group that may optionally contain a ring structure or an unsaturated bond, or a group represented by the following general formula (8), wherein one or two of R17, R18 and R19 are a hydrogen atom, one or two thereof are the following general formula (9), and the total number of carbon atoms of R17, R18 and R19 is 4 or more. m represents a numerical value of 0 or 1.)

[Formula 9]

(8)

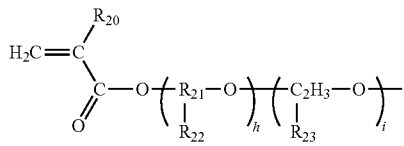

(wherein R20 and R23 represent a hydrogen atom or a methyl group, R21 is a trivalent organic group having 2 to 8 carbon atoms that may optionally contain an oxygen atom, and R22 represents a hydrogen atom or the following general formula (9). h represents a numerical value of 0 or 1 and i represents a numerical value of 0 to 10.)

[Formula 10]

$$—CH_2X \qquad (9)$$

(wherein X represents a hydrogen atom or a chlorine atom).

Examples of the general formula (7) include respective monoesters and diesters, such as methyl acid phosphate, ethyl acid phosphate, butyl acid phosphate, octyl acid phosphate, lauryl acid phosphate, tridecyl acid phosphate, stearyl acid phosphate, oleyl acid phosphate, tetracosyl acid phosphate, nonylphenyl acid phosphate, phenyl acid phosphate, polyoxyethylene alkyl ether acid phosphate, polyoxyethylene alkyl phenyl ether acid phosphate, acid phosphooxyethyl methacrylate, acid phosphooxypolyoxyethylene glycol monomethacrylate, acid phosphooxypolyoxypropylene glycol monomethacrylate, 3-chloro-2-acid phosphooxypropyl methacrylate, diethyl hydrogen phosphite, dilauryl hydrogen phosphite, dioleyl hydrogen phosphite and diphenyl hydrogen phosphite, and mixtures thereof. These acidic organic phosphoric or phosphorous acid esters may also partially include triesters of an unsubstituted inorganic phosphoric acid and/or triesters not exhibiting acidity. Among them, particularly preferable examples include monoesters and diesters, such as octyl acid phosphate, lauryl acid phosphate, tridecyl acid phosphate, stearyl acid phosphate, acid phosphooxypolyoxypropylene glycol monomethacrylate and dilauryl hydrogen phosphites, and mixtures thereof.

Examples of the general formula (8) include 2-(meth)acryloyloxyethyl acid phosphate, di-2-(meth)acryloyloxyethyl acid phosphate and tri-2-(meth)acryloyloxyethyl phosphate, and any mixtures thereof; 2-(meth)acryloyloxypropyl acid phosphate, di-2-(meth)acryloyloxypropyl acid phosphate and tri-2-(meth)acryloyloxypropyl phosphate, and any mixtures thereof; phenyl-2-(meth)acryloyloxyethyl acid phosphate, butyl-2-(meth)acryloyloxyethyl acid phosphate, octyl-2-(meth)acryloyloxyethyl acid phosphate, bis(2-chloroethyl) vinyl phosphonate, 3-chloro-2-acid phosphooxypropyl (meth)acrylate, acid phosphooxy-polyoxyethylene glycol mono(meth)acrylate and acid phosphooxy-polyoxypropylene glycol mono(meth)acrylate.

Substances constituting the inorganic phosphoric acid salts described in (i) or acidic organic phosphoric or phosphorous acid ester salts described in (ii) which can be used in the present invention include alkali metals such as potassium and sodium, alkaline earth metals such as calcium and magnesium, ammonia, and organic amines represented by the following general formula (5):

[Formula 11]

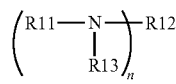

(wherein R11, R12 and R13 may be the same or different, are each a hydrogen atom, or a mono- or divalent hydrocarbon group having 1 to 30 carbon atoms that may optionally contain an ether bond, an ester bond, a hydroxyl group, a carbonyl group, and a thiol group, wherein R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multi-ring that is capable of containing one or more additional nitrogen atoms and/or oxygen atoms as a crosslinking member. R11, R12 and R13 are not a hydrogen atom at the same time. n represents a numerical value of 1 to 2.)

Particularly preferable examples among these amines include diethylamine, triethylamine, propylamine, dipropylamine, tripropylamine, octylamine, dioctylamine and trioctylamine, and additionally primary, secondary and tertiary amines having a straight or branched alkyl group having in the order of 10 to 20 carbon atoms, morpholine, N-methylmorpholine, ethanolamine, diethanolamine, N-methylethanolamine, N-methyldiethanolamine, N,N-dimethylethanolamine, triethanolamine, and the like.

The phosphoric acid compounds are added in an amount of 0.01 to 10 parts by weight and preferably 0.01 to 5 parts by weight based on 100 parts by weight of a metal component in the metallic particles. These are preferably dissolved or dispersed in a solvent in advance and added.

The phosphoric acid compounds may be added at the time of pulverizing or extending a raw material metal powder by a ball mill, may be mixed in a slurry in which a solvent is added to the metallic particles, or may be kneaded in a paste having a reduced amount of a solvent. These may be added after treating the metallic particles with at least one compound selected from the heteropolyanion compound or the mixed-coordination type heteropolyanion compound or may be simultaneously added with at least one compound selected from the heteropolyanion compounds or the mixed-coordination type heteropolyanion compounds, and are preferably added after treating the metallic particles with at least one compound selected from the heteropolyanion compounds or the mixed-coordination type heteropolyanion compounds or after the subsequent polymerization treatment of the organic oligomer or polymer. The phosphoric acid compounds may be added when the metallic pigment composition is mixed in water-based coatings or water-based inks in which resins as a coating film-forming component are dissolved or dispersed in a medium mainly containing water.

In order to achieve a uniformly mixed state, the phosphoric acid compounds are preferably diluted with a solvent in advance and added. Examples of the solvent for use in dilution include water, alcohols such as methanol and isopropanol; ether alcohols such as ethylene glycol monobutyl ether and propylene glycol monomethyl ether; and esters thereof; hydrocarbon solvents such as hexane, octane, isooctane, benzene, toluene, xylene, tetralin and decalin; industrial gasolines such as mineral spirit and solvent naphtha; esters such as ethyl acetate and butyl acetate; ketones such as methyl ethyl ketone, methyl isobutyl ketone and cyclohexanone; and mineral oils.

At least one of an antioxidant, a light stabilizer, a polymerization inhibitor and a surfactant, and if necessary, a silane coupling agent and a titanium coupling agent may also be added.

The antioxidant is typified by a phenol compound, a phosphorus compound and a sulfur compound. As a suitable compound, exemplified are phenol compounds such as 2,6-di-t-butylphenol, 2,4-dimethyl-6-t-butylphenol, 2,6-di-t-butyl-p-cresol (BHT), 2,6-di-t-butyl-4-ethyl-phenol, 2,4,6-tri-t-butylphenol, butylhydroxyanisole (BHA), 2,2'-methylene bis (4-methyl-6-t-butylphenol), 4,4'-thiobis(3-methyl-6-t- butylphenol), octadecyl-3-(3,5-di-t-butylphenyl)propionate (IRGANOX 1076), hexamethylene bis[3-(3,5-di-t-butyl-4-hydroxyphenyl)propionate] (IRGANOX 259), thiodiethylene bis[3-(3,5-di-t-butyl-4-hydroxyphenyl)propionate] (IRGANOX 1035), tris(3,5-di-t-butyl-4-hydroxybenzyl) isocyanurate (IRGANOX 3114), tetrakis[methylene-3-(3',5'-di-t-butyl-4-hydroxyphenyl)propionate]methane (IRGANOX 1010), calcium diethylbis[[[3,5-bis(1,1-dimethylethyl)-4-hydroxyphenyl]methyl]phosphonate] (IRGANOX 1425 WL), ethylenebis(oxyethylene)bis[3-(5-t-butyl-4-hydroxy-m-tolyl)propionate] (IRGANOX 245), benzene propanoic acid, 3,5-bis(1,1-dimethylethyl)-4-hydroxyalkylester (IRGANOX 1135), N,N'-hexane-1,6-diyl bis[3-(3,5-di-t-butyl-4-hydroxyphenyl)propionamide] (IRGANOX 1098) and tocopherol; phosphorus compounds such as triphenylphosphite, diphenylnonylphenylphosphite, tris-(2,4-di-t-butylphenyl)phosphite, trisnonylphenylphosphite, tris-(mono- and di-mixed nonylphenyl)phosphite, diphenylisooctyiphosphite, 2,2'-methylenebis(4,6-di-t-butylphenyl)octylphosphite, diphenylisodecylphosphite, phenyldiisodecylphosphite, diphenylmono(tridecyl)phosphite, 2,2'-ethylidenebis(4,6-di-t-butylphenol)fluorophosphite, phenyldiisodecylphosphite, phenyldi(tridecyl)phosphite, tris(2-ethylhexyl)phosphite, tris(isodecyl)phosphite, tris(tridecyl)phosphite, dibutyl hydrogen phosphite, trilauryltrithiophosphite, tetrakis(2,4-di-t-butylphenyl)-4,4'-biphenylenediphosphonite, 4,4'-isopropylidenediphenolalkyl(C12 to C15)phosphite, 4,4'-butylidenebis(3-methyl-6-t-butylphenyl)ditridecylphosphite, distearyl-pentaerythritoldiphosphite, bis(nonylphenyl)pentaerythritoldiphosphite, bis(2,4-di-t-butylphenyl)pentaerythritoldiphosphite, cyclic neopentane tetrayl bis(2,4-di-t-butylphenylphosphite), phenyl-bisphenol A pentaerythritoldiphosphite, tetraphenyl dipropylene glycol diphosphite, 1,1,3-tris(2-methyl-4-di-tridecylphosphite-5-t-butylphenyl)butane, tetraphenyl tetra(tridecyl)pentaerythritol tetraphosphite, zinc dialkyldithiophosphate (ZnDTP), 3,4,5,6-dibenzo-1,2-oxaphosphane-2-oxide, 3,5-di-t-butyl-4-hydroxybenzylphosphite-diethylester and a hydrogenated bisphenol A phosphite polymer; sulfur compounds such as dilauryl-3,3'-thiodipropionic acid ester (DLTTDP), ditridecyl-3,3'-thiodipropionic acid ester, dimyristyl-3,3'-thiodipropionic acid ester (DMTDP), distearyl-3,3'-thiodipropionic acid ester (DSTDP), laurylstearyl-3,3'-thiodipropionic acid ester, pentaerythritol tetra(β-lauryl-thiopropionate)ester, stearylthiopropionamide, bis[2-methyl-4-(3-n-alkyl(C12 to C14)thiopropionyloxy)-5-t-butylphenyl]sulfide, dioctadecyldisulfide, 2-mercaptonbenzimidazole, 2-mercapto-6-methylbenzimidazole and 1,1'-thiobis(2-naphthol); ascorbic acid; and the like.

The light stabilizer is typified by a benzotriazole compound, a benzophenone compound, a salicylate compound, cyanoacrylate, an oxalic acid derivative, a hindered amine compound (HALS) and a hindered phenol compound, some of which is used as the above-described antioxidant as well. Examples of a suitable compound include 2-(2'-hydroxy-5'-methylphenyl)benzotriazole, 3",4",2-(2'-hydroxy-5'-t-octylphenyl)benzotriazole, 2-(2'-hydroxy-4'-t-octoxyphenyl)benzotriazole, 2-(2'-hydroxy-3',5'-di-t-butylphenyl)benzotriazole, 2-(2'-hydroxy-3',5'-di-t-amylphenyl)benzotriazole, 2-(2'-hydroxy-3'-dodecyl-5'-methylphenyl)benzotriazole, 2-(2'-hydroxy-3',5'-bis(α,α-dimethylbenzyl)phenylbenzotriazole, 2-[2'-hydroxy-3'-(3",4",5",6"-tetraphthalimidemethyl)-5'-methylphenyl]benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2,2'-methylenebis[4-(1,1,3,3-tetramethylbutyl)-6-(2H-benzotriazole-2-yl)phenol, a condensate of methyl-3-[3-t-butyl-5-(2H-benzotriazole-2-yl)-4-hydroxyphenylpropionate and polyethylene glycol (molecular weight: about 300), 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, 2-hydroxy-4-methoxy-2'-carboxybenzophenone, 2-hydroxy-4-methoxy-5-sulfoxybenzophenone, 2,2'-dihydroxy-4,4'-dimethoxybenzophenone, 2,2',4,4'-tetrahydroxybenzophenone, 2,2'-dihydroxy-4,4'-dimethoxy-5-sodiumsulfoxybenzophenone, bis(5-benzoyl-4-hydroxy-2-methoxyphenyl)methane, a polymer of 4-(2-acryloyloxyethoxy)-2-hydroxybenzophenone, a mixture of 2,2'-dihydroxy-4,4'-dimethoxybenzophenone and other tetrasubstituted benzophenone, phenylsalicylate, 2,5-di-t-butyl-4-hydroxybenzoic acid.n-hexadecylester, 4-t-butylphenylsalicylate, 4-t-octylphenylsalicylate, 2,4-di-t-butylphenyl-3',5'-di-t-butyl-4'-hydroxybenzoate, ethyl(β,β-diphenyl)cyanoacrylate, 2-ethylhexyl(β,β-diphenyl)cyanoacrylate, 2-ethoxy-2'-ethyloxalic acid bisanilide, 2-ethoxy-5-t-butyl-2'-ethyloxalic acid bisanilide, an oxalic acid anilide derivative, an indole system, phenyl-4-piperidinylcarbonate, [4-(4-hydroxy-3,5-di-t-butylphenyl)propionyl]-N-(4-hydroxy-3,5-di-t-butylphenyl)methyl-2,2,6,6-tetramethylpiperidine, 1,1'-(1,2-ethanediyl)bis(3,3,5,5-tetramethylpiperazineone), bis(2,2,6,6-tetramethyl-4-piperidinyl)sebacate, bis-[N-methyl-2,2,6,6-tetramethyl-piperidinylsebacate, bis(1,2,2,6,6-pentamethyl-4-piperidyl)-2-(3,5-di-t-butyl-4-hydroxybenzyl)-2-n-butylmalonate, a condensate of 1,2,3,4-butanecarboxylic acid, 2,2,6,6-tetramethyl-4-piperidinol and tridecyl alcohol, a condensate of 1,2,3,4-butanecarboxylic acid, 1,2,2,6,6-pentamethyl-4-piperidinol and tridecyl alcohol, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly[[6-(1,1,3,3-tetramethylbutylamino)-1,3,5-triazine-2,4-diyl], [(2,2,6,6-tetramethylpiperidine)imino]hexamethylene[(2,2,6,6-tetramethylpiperidyl)imino]], poly[[6-morpholino-s-triazine-2,4-diyl-2,2,6,6-tetramethylpiperidylimino-hexamethylene][2,2,6,6-tetramethylpiperidylimino]], a condensate of 1,2,3,4-butanetetracarboxylic acid, 2,2,6,6-tetramethyl-4-piperidinol and β,β,β',β'-tetramethyl-3,9-(2,4,8,10-tetraoxaspiro[5,5]undecane)diethanol, 1,6-hexamethylene bis(N,N-dimethylsemicarbazide), 1,1,1',1'-tetramethyl-4,4'-(methylene-di-p-phenylene)disemicarbazide, and the like.

The polymerization inhibitor is typified by phenols, quinones, a nitro compound, a nitroso compound, amines and sulfides. Examples of a suitable compound include phenols such as hydroquinone, hydroquinonemonomethylether, mono-tert-butylhydroquinone, catechol, p-tert-butylcatechol, p-methoxyphenol, p-tert-butylcatechol, 2,6-di-tert-butyl-m-cresol, pyrogallol, β-naphthol and 4-methoxy-1-naphthol; quinones such as benzoquinone, 2,5-diphenyl-p-benzoquinone, p-toluquinone and p-xyloquinone; nitro compounds or nitroso compounds such as nitromethane, nitroethane, nitrobutane, nitrobenzene, a nitrobenzenesulfonic acid compound, m-dinitrobenzene, 2-methyl-2-nitrosopropane, α-phenyl-tert-butylnitrone and 5,5-dimethyl-1-pyrroline-1-oxide; amines such as chloranil-amine, diphenylamine, diphenylpicryihydrazine, phenol-α-naphthylamine, pyridine and phenothiazine; and sulfides such as dithiobenzoylsulfide and dibenzyltetrasulfide.

Examples of the surfactant include non-ionic surfactants typified by: polyoxyalkylene alkyl ethers such as polyoxyethylene lauryl ether, polyoxyethylene cetyl ether, polyoxyethylene stearyl ether and polyoxyethylene oleyl ether; polyoxyalkylene alkylphenyl ethers such as polyoxyethylene octylphenyl ether and polyoxyethylene nonylphenyl ether; polyoxyalkylene alkylaminoethers such as polyoxyethylene laurylaminoether and polyoxyethylene stearylaminoether; sorbitan fatty acid esters such as sorbitan monolaurate, sorbitan monopalmitate, sorbitan monostearate and sorbitan monooleate; polyoxyalkylene sorbitan fatty acid esters such as polyoxyethylene sorbitan monolaurate, polyoxyethylene sorbitan monopalmitate, polyoxyethylene sorbitan monostearate and polyoxyethylene sorbitan monooleate; polyalkylene glycol fatty acid esters such as polyethylene glycol monolaurate, polyethylene glycol monooleate, polyethylene glycol monostearate, polyethylene glycol dilaurate and polyethylene glycol distearate; and glycerin fatty acid esters such as lauric acid monoglyceride, stearic acid monoglyceride and oleic acid monoglyceride. Also, the examples of the surfactant include anionic surfactants typified by: sulfuric acid ester salts such as polyoxyethylene lauryl ether sulfate sodium, polyoxyethylene octyl phenyl ether sulfate sodium, polyoxyethylene nonyl phenyl ether sulfate sodium, laurylsulfuric acid triethanolamine, sodium lauryl sulfate, potassium lauryl sulfate and ammonium lauryl sulfate; sulfonic acid salts such as sodium dodecylbenzenesulfonate, sodium alkylnaphthalenesulfonate and sodium dialkylsulfosuccinate; and phosphoric acid ester salts such as potassium alkylphosphate. Also, the examples of the surfactant include cationic surfactants typified by: quaternary ammonium salts such as lauryl trimethyl ammonium chloride, stearyl trimethyl ammonium chloride and cetyl trimethyl ammonium chloride. Also, one, or two or more selected from them can be also used as the surfactant. Among them, polyoxyethylene lauryl ether, polyoxyethylene cetyl ether, polyoxyethylene stearyl ether, polyoxyethylene oleyl ether or a mixture thereof is particularly preferably exemplified.

Each of the antioxidant, the light stabilizer and the polymerization inhibitor is added in an amount of 0.01 to 10 parts by weight and preferably 0.01 to 5 parts by weight based on 100 parts by weight of a metal component in the metallic particles. These are preferably dissolved or dispersed in a solvent in advance and added.

The surfactant is added in an amount of 0.01 to 30 parts by weight and preferably 0.01 to 20 parts by weight based on 100 parts by weight of a metal component in the metallic particles. It is preferably dissolved or dispersed in a solvent in advance and added.

This mixture is stirred and mixed at a temperature from 10 to 200° C., preferably 20 to 160° C., for 10 minutes to 72 hours, preferably 20 minutes to 48 hours. The excess solvent is removed, thereby allowing the final content of the metallic pigment to be desirably from 40 to 90%. The obtained metallic pigment composition may be aged at 40° C. to 120° C., preferably 50° C. to 110° C., for 6 hours to 3 months, preferably one day to 30 days.

The metallic pigment composition obtained by the present invention can be added to water-based coatings or water-based inks, in which resins as a coating film-forming component are dissolved or dispersed in a medium mainly containing water, to thereby make them metallic water-based coatings or metallic water-based inks. The metallic pigment composition can also be kneaded with resins or the like and thus used as a waterproof binder or filler. The antioxidant, light stabilizer and polymerization inhibitor, and surfactant may be added when the metallic pigment composition is compounded in, for example, water-based coatings or water-based inks, or resins.

When the metallic pigment composition is used for coatings or inks, it may be added to water-based coatings or water-based inks as it is, but is preferably added thereto after being dispersed in a solvent in advance. The solvent here used includes water, texanol, diethylene glycol monobutyl ether, propylene glycol monomethyl ether and the like. Examples of the resins include acrylic resins, polyester resins, polyether resins, epoxy resins, fluorine resins and rosin resins.

Examples of the acrylic resins include (meth)acrylates such as methyl(meth)acrylate, ethyl(meth)acrylate, isopropyl (meth)acrylate, n-butyl(meth)acrylate, 2-ethylhexyl (meth) acrylate and lauryl(meth)acrylate; (meth)acrylates having active hydrogen, such as 2-hydroxyethyl(meth)acrylate, 2-hydroxypropyl(meth)acrylate, 2-hydroxybutyl(meth)acrylate, 3-hydroxypropyl(meth)acrylate and 4-hydroxybutyl (meth)acrylate; unsaturated carboxylic acids such as acrylic acid, methacrylic acid, maleic acid and itaconic acid; unsaturated amides such as acrylamide, N-methylolacrylamide and diacetoneacrylamide; and acrylic resins obtained by polymerizing one or a mixture selected from other polymerizable monomers such as glycidyl methacrylate, styrene, vinyltoluene, vinyl acetate, acrylonitrile, dibutyl fumarate, p-styrenesulfonic acid and allylsulfosuccinic acid.

A polymerization method is generally emulsion polymerization, but the acrylic resins can also be produced by suspension polymerization, dispersion polymerization or solution polymerization. The emulsion polymerization can also be stepwise polymerization.

Examples of the polyester resins include polyester resins obtained by condensation reaction of one or a mixture selected from the group of carboxylic acids such as succinic acid, adipic acid, sebacic acid, dimer acid, maleic anhydride, phthalic anhydride, isophthalic acid, terephthalic acid, trimellitic acid and pyromellitic acid, with one or a mixture of polyhydric alcohols selected from the group of diols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol and 2,2-diethyl-1,3-propanediol, triols such as glycerin and trimethylolpropane, and tetraols such as diglycerin, dimethylolpropane and pentaerythritol; and polycaprolactones obtained by ring-opening polymerization of $\epsilon$-caprolactone to a hydroxyl group of a low molecular weight polyol.

The polyether resins include polyether polyols obtained by adding one or a mixture of alkylene oxides such as ethylene oxide, propylene oxide, butylene oxide, cyclohexene oxide and styrene oxide to one or a mixture of polyhydric hydroxyl compounds by means of a strong basic catalyst such as hydroxide of lithium, sodium, potassium or the like, alcoholate or alkylamine; polyether polyols obtained by reacting alkylene oxide with a polyfunctional compound such as ethylenediamines; so-called polymer polyols obtained by polymerizing acrylamide or the like by using these polyethers as a medium; and the like.

These resins are preferably emulsified, dispersed or dissolved in water. Thus, carboxyl groups, sulfone groups and the like contained in the resins can be neutralized.

As a neutralizer for neutralizing the carboxyl groups, the sulfone groups and the like, one or more selected from, for example, ammonia, and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine can be used. Preferably, triethylamine and dimethylethanolamine which are tertiary amines, and the like can be used.

Preferable resins are acrylic resins and polyester resins.

A melamine curing agent, an isocyanate curing agent, and a resin such as urethane dispersion can be used in combination, if necessary. Furthermore, an inorganic pigment, an organic pigment, an extender pigment, a silane coupling agent, a titanium coupling agent, a dispersant, an antisettling agent, a leveling agent, a thickening agent, and a defoamer, which are generally added to coatings, can be combined. The surfactant may be further added in order to make dispersibility in coatings better, and the antioxidant, the light stabilizer and the polymerization inhibitor may be further added in order to make storage stability of coatings better.

EXAMPLES

Hereinafter, Examples of the present invention will be illustrated.

Example 1

To 135 g of a commercially available aluminum paste (produced by Asahi Kasei Chemicals Corporation, trade name "GX-3100 (average particle diameter: 10.5 µm, nonvolatile content: 74%)") was added 698 g of mineral spirit and dispersed therein to form a slurry, and a solution in which 0.5 g of a hydrate of phosphotungstomolybdic acid ($H_3PW_6Mo_6O_{40}$) was dissolved in 30 g of isopropanol was gradually added while stirring the slurry and stirred for 1 hour while maintaining the temperature of the slurry at 70° C. Then, 0.75 g of acrylic acid was added and stirred for 30 minutes. Thereafter, 5.6 g of trimethylolpropane triacrylate (TMPTA), 2.4 g of di-trimethylolpropane tetraacrylate (DTMPTA) and 3.0 g of 2,2'-azobis-2,4-dimethylvaleronitrile (ADVN) were dissolved in 80 g of mineral spirit, and the obtained solution was added over 3 hours. Thereafter, the stirring was continued for additional 2 hours. After the completion of the reaction, the obtained slurry was filtrated after cooling, thereby obtaining 158 g of an aluminum pigment composition having a nonvolatile content of 70%.

Example 2

2.5 parts by weight of tridecyl acid phosphate was added based on 100 parts by weight of an aluminum metal component in the aluminum pigment composition obtained in Example 1, and kneaded at 40° C. for 2 hours to obtain an aluminum pigment composition.

Example 3

The same procedure as in Example 1 was performed except that 0.75 g of acrylic acid was changed to 0.80 g of methacrylic acid, and 2.0 g of divinylbenzene was used in addition to 5.6 g of trimethylolpropane triacrylate (TMPTA) and 2.4 g of di-trimethylolpropane tetraacrylate (DTMPTA), thereby obtaining 159 g of an aluminum pigment composition having a nonvolatile content of 70%.

Example 4

The same procedure as in Example 1 was performed except that 0.75 g of acrylic acid was changed to 1.3 g of 2-acryloyloxyethyl acid phosphate dissolved in isopropyl alcohol, thereby obtaining 159 g of an aluminum pigment composition having a nonvolatile content of 69%.

Example 5

The same procedure as in Example 1 was performed except that 0.5 g of a hydrate of phosphotungstomolybdic acid ($H_3PW_6Mo_6O_{40}$) was changed to 1.0 g of a hydrate of silicotungstomolybdic acid ($H_4SiW_3Mo_9O_{40}$), 0.75 g of acrylic acid was changed to 4.2 g of acid phosphooxy-polyoxyethylene glycol monomethacrylate, and trimethylolpropane triacrylate (TMPTA) was changed to trimethylolpropane trimethacrylate (TMPTMA), thereby obtaining 171 g of an aluminum pigment composition having a nonvolatile content of 65%.

Production Example 1

To 162 g of a commercially available aluminum paste (produced by Asahi Kasei Chemicals Corporation, trade name "GX-3100 (average particle diameter: 10.5 nonvolatile content: 74%)") was added 560 g of ethylene glycol monobutyl ether and dispersed therein to form a slurry, and a solution in which 0.6 g of a hydrate of phosphotungstomolybdic acid ($H_3PW_6Mo_6O_{40}$) was dissolved in 30 g of ethylene glycol monobutyl ether was gradually added while stirring the slurry and stirred for 2 hours while maintaining the temperature of the slurry at 70° C. After the completion of the reaction, the obtained slurry was filtrated after cooling, thereby obtaining 160 g of an aluminum pigment composition having a nonvolatile content of 75.3%.

Example 6

To 133 g of the aluminum pigment composition obtained in Production Example 1 was added 700 g of mineral spirit and dispersed therein to form a slurry, which was then stirred for 30 minutes while maintaining the temperature of the slurry at 70° C. Then, 0.75 g of acrylic acid was added and stirred for 30 minutes. Thereafter, 5.6 g of trimethylolpropane triacrylate (TMPTA), 2.4 g of di-trimethylolpropane tetraacrylate (DTMPTA) and 3.0 g of 2,2'-azobis-2,4-dimethylvaleronitrile (ADVN) were dissolved in 80 g of mineral spirit, and the obtained solution was added over 3 hours. Thereafter, the stirring was continued for additional 2 hours. After the completion of the reaction, the obtained slurry was filtrated after cooling, thereby obtaining 160 g of an aluminum pigment composition having a nonvolatile content of 68.5%.

Example 7

3.0 parts by weight of morpholine salt of tridecyl acid phosphate was added based on 100 parts by weight of an aluminum metal component in the aluminum pigment composition obtained in Example 6, and kneaded at 40° C. for 2 hours to obtain an aluminum pigment composition.

Production Example 2

To 162 g of a commercially available aluminum paste (produced by Asahi Kasei Chemicals Corporation, trade name "GX-3100 (average particle diameter: 10.5 µm, nonvolatile content: 74%)") was added 560 g of ethylene glycol monobutyl ether and dispersed therein to form a slurry, and a solution in which 1.5 g of a hydrate of sodium phosphomolybdate ($Na_3PMo_{12}O_{40}$) was dissolved in 30 g of ethylene glycol monobutyl ether was gradually added while stirring the slurry and stirred for 2 hours while maintaining the temperature of the slurry at 70° C. Then, 2.4 g of 2-acryloyloxyethyl acid phosphate was added and stirred for 2 hours. After the completion of the reaction, the obtained slurry was filtrated after cooling, thereby obtaining 164 g of an aluminum pigment composition having a nonvolatile content of 75.2%.

Example 8

To 133 g of the aluminum pigment composition obtained in Production Example 2 was added 700 g of mineral spirit and dispersed therein to form a slurry, which was then stirred for 30 minutes while maintaining the temperature of the slurry at 70° C. Thereafter, 5.6 g of trimethylolpropane triacrylate (TMPTA), 2.4 g of pentaerythritol tetraacrylate and 3.0 g of 2,2'-azobis-2,4-dimethylvaleronitrile (ADVN) were dissolved in 80 g of solvent naphtha, and the obtained solution was added over 3 hours. Thereafter, the stirring was continued for additional 2 hours. After the completion of the reaction, the obtained slurry was filtrated after cooling, thereby obtaining 158 g of an aluminum pigment composition having a nonvolatile content of 68.8%.

Example 9

The same procedure as in Example 8 was performed except that 2.4 g of 2-acryloyloxyethyl acid phosphate in Production Example 2 was changed to 2.0 g of acrylic acid, and 1.6 g of trimethylolpropane triacrylate (TMPTA), 2.4 g of di-trimethylolpropane tetraacrylate (DTMPTA) and 6.0 g of 9,9-bis[4-(acryloyloxyethoxy)phenyl]fluorine were used instead of 5.6 g of trimethylolpropane triacrylate (TMPTA) and 2.4 g of pentaerythritol tetraacrylate in Example 8, thereby obtaining 168 g of an aluminum pigment composition having a nonvolatile content of 67%.

Production Example 3

To 162 g of a commercially available aluminum paste (produced by Asahi Kasei Chemicals Corporation, trade name "GX-3100 (average particle diameter: 10.5 µm, nonvolatile content: 74%)") was added 560 g of ethylene glycol monobutyl ether and dispersed therein to form a slurry, and a solution in which 1.5 g of a hydrate of silicomolybdic acid ($SiMo_{12}O_{40}$) was dissolved in 30 g of ethylene glycol monobutyl ether was gradually added while stirring the slurry and stirred for 2 hours while maintaining the temperature of the slurry at 70° C. Then, 1.5 g of dimethylaminoethyl acrylate was added and stirred for 2 hours. After the completion of the reaction, the obtained slurry was filtrated after cooling, thereby obtaining 163 g of an aluminum pigment composition having a nonvolatile content of 75.0%.

Example 10

The same procedure as in Example 4 was performed except that the aluminum pigment composition obtained in Production Example 2 was changed to the aluminum pigment composition obtained in Production Example 3, 5.6 g of trimethylolpropane triacrylate (TMPTA) and 2.4 g of pentaerythritol tetraacrylate were changed to 8.0 g of pentaerythritol triacrylate and 1.0 g of 2-hydroxyethyl methacrylate, thereby obtaining 155 g of an aluminum pigment composition having a nonvolatile content of 70.2%.

Production Example 4

To 135 g of a commercially available aluminum paste (produced by Asahi Kasei Chemicals Corporation, trade name "GX-3100 (average particle diameter: 10.5 µm, nonvolatile content: 74%)") were added an N,N-dimethylethanolamine salt of phosphovanadomolybdic acid ($H_4PV_1Mo_{11}O_{40}$) and ascorbic acid so that the amounts of the salt and the acid were, respectively, 1.0 part by weight and 0.5 parts by weight based on 100 parts by weight of an aluminum metal component in the aluminum paste, and stirred at 70° C. for 6 hours.

Example 11

The same procedure as in Example 3 was performed except that 133 g of the aluminum pigment composition obtained in Production Example 1 was changed to 135 g of the aluminum pigment composition obtained in Production Example 4, thereby obtaining 163 g of an aluminum pigment composition having a nonvolatile content of 67.0%.

Example 12

2.0 parts by weight of polyphosphoric acid dissolved in isobutanol was added based on 100 parts by weight of an aluminum metal component in the aluminum pigment composition obtained in Example 11, and kneaded at 40° C. for 2 hours, thereby obtaining an aluminum pigment composition.

Comparative Example 1

The same procedure as in Example 1 was performed except that the step of adding a hydrate of phosphotungstomolybdic acid ($H_3PW_6Mo_6O_{40}$) was omitted, thereby obtaining 165 g of an aluminum pigment composition having a nonvolatile content of 67.1%.

Comparative Example 2

The same procedure as in Example 1 was performed except that the step of adding and polymerizing acrylic acid, TMPTA, DTMPTA and ADVN was omitted, thereby obtaining an aluminum pigment composition having a nonvolatile content of 75%.

Comparative Example 3

A commercially available aluminum paste (produced by Asahi Kasei Chemicals Corporation, trade name "GX-3100 (average particle diameter: 10.5 µm, nonvolatile content: 74%)") was used as it is.

Examples 13 to 24, Comparative Examples 4 to 6

With respect to the aluminum pigment compositions obtained in Examples 1 to 12, and the aluminum pigment compositions obtained in Comparative Examples 1 to 3, solvent-based metallic coatings and water-based metallic coatings, each of which has the following composition were prepared. The solvent-based metallic coatings were used to perform adhesion and chemical resistance tests, and the water-based metallic coatings were used to perform coating stability, storage stability and coating film color tone evaluations.

The results thereof were shown as Examples 13 to 24 and Comparative Examples 4 to 6.

[Preparation of Solvent-Based Metallic Coating]

Solvent-based metallic coatings, each of which has the following components were prepared.

Aluminum pigment composition: 5 g as a nonvolatile content

Thinner (produced by Musashi Paint Co., Ltd., trade name "Pla Ace thinner No. 2726"): 50 g Acrylic resin (produced by Musashi Paint Co., Ltd., trade name "Pla Ace No. 7160"): 33 g

[Evaluation]

An ABS resin plate was coated with each of the prepared metallic coatings by using an air-spray apparatus so that the thickness of a film to be dried was 10 μm, and dried in an oven at 60° C. for 30 minutes to obtain a coated plate for evaluation.

The coated plate for evaluation was used to perform the following evaluation.

[Evaluation 1 (Adhesion)]

Cellotape (registered trademark, manufactured by Nichiban Co., Ltd., CT-24) was adhered to the coating film on the coated plate for evaluation and pulled at an angle of 45 degrees, and the degree of the aluminum pigment particles peeled was visually observed. The judging criteria are as follows.

○: no peeling

Δ: slightly peeling x: peeling

[Evaluation 2 (Chemical Resistance)]

The lower half of the coated plate for evaluation was immersed in a beaker to which 0.1 N-NaOH aqueous solution was added, and left to stand at 55° C. for 4 hours. The coated plate after testing was washed with water and dried, and then colors of the immersed portion and the unimmersed portion were measured under Condition d (8-d method) of JIS-Z-8722 (1982) to determine color difference ΔE according to 6.3.2 of JIS-Z-8730 (1980). The following judging was performed, depending on values of color difference ΔE. (The smaller values are more preferable.)

○: less than 1.0 x: 1.0 or more

[Preparation of Water-Based Metallic Coating]

Water-based metallic coatings, each of which has the following components were prepared.

Aluminum pigment composition: 12.0 g as nonvolatile content

Diethylene glycol monobutyl ether: 18.0 g

Polyoxyethylene lauryl ether (non-ionic surfactant)

(produced by Matsumoto Yushi-Seiyaku Co., Ltd., trade name "Actinol L5"): 6.0 g

Distilled water: 12.0 g

Acrylic emulsion (acid value: 15 mgKOH/g, hydroxyl value: 30 mgKOH/g,

Tg: 25° C., solid content: 42%, number average molecular weight: 93,000, pH: 8.4): 240 g The above components were mixed, and then the pH was adjusted from 7.7 to 7.8 by ammonia water and the viscosity was adjusted from 600 to 700 mPa·s (B-type viscometer, No. 3 rotor, 60 rpm, 25° C.) by a carboxylic acid-type thickening agent and distilled water.

The prepared water-based metallic coatings were used to perform the following evaluations.

[Evaluation 3 (Coating Stability)]

The coatings prepared by the above formulation were visually evaluated in terms of changes in state after being left to stand at 23° C. for 24 hours.

○: no change was particularly observed.

Δ: aggregation of aluminum pigments was slightly observed.

x: aggregation of aluminum pigments was observed.

[Evaluation 4 (Storage Stability (Gas Generation) Evaluation)]

Each of water-based metallic coatings (200 g) was taken in a flask, the flask was placed in a constant temperature water bath at 40° C., and the cumulative amount of generated hydrogen gas was observed until the elapse of 24 hours. The following criteria were used to evaluate the amount of the gas generated, and were evaluated as an index of storage stability in each coating.

⊚: 0 ml in the range of experimental error (±about 0.5 ml)

○: less than 1.0 ml

Δ: 1.0 ml or more and less than 5.0 ml x: 5.0 ml or more and less than 20 ml xx: 20 ml or more

[Evaluation 5 (Coating Film Color Tone Evaluation)]

The coatings after being left at 23° C. for 24 hours were used to form coating films, and each of the coating films was evaluated for brightness and flip-flop feeling.

Brightness

Brightness was evaluated by using a laser-type metallic feeling measuring apparatus manufactured by Kansai Paint Co., Ltd., Alcope LMR-200. The apparatus includes a laser light source having an incident angle of 45 degrees, a light receiver having an acceptance angle of 0 degrees and a light receiver having an acceptance angle of −35 degrees as optical conditions. With respect to a measurement value, an IV value was determined at an acceptance angle of −35 degrees, where the maximum intensity of light is obtained by subtracting the light in the specular reflection region where the laser light is reflected on the surface of the coating film from the reflected laser light. The IV value is a parameter proportional to the intensity of regularly reflected light from the coating film, and indicates the magnitude of brightness of light. The judging criteria are as follows.

⊚: higher than Comparative Example 4 by 20 or more

○: difference from Comparative Example 4 being +10 to 20

Δ: difference from Comparative Example 4 being less than ±10 x: lower than Comparative Example 4 by 10 or more

Flip-Flop Feeling (FF)

Flip-flop feeling was evaluated by using a variable angle color meter manufactured by Suga Test Instruments Co., Ltd. An F/F value was determined from the slopes of the logarithms of the reflected light intensities (L values) at observation angles (acceptance angles) of 30 degrees and 80 degrees against a light source having an incident angle of 45 degrees. The F/F value is a parameter which is proportional to the orientation degree of a metallic pigment, and indicates the magnitude of the flip-flop feeling of the pigment. The judging criteria are as follows.

⊚: higher than Comparative Example 4 by 0.1 or more

○: difference from Comparative Example 4 being +0.05 to 0.1

Δ: difference from Comparative Example 4 being less than ±0.05 x: lower than Comparative Example 4 by 0.05 or more

The results of Evaluations 1 to 5 are shown in Table 1.

TABLE 1

| | Aluminum pigment composition used | Evaluation 1 Adhesion | Evaluation 2 Chemical Resistance | Evaluation 3 Coating Stability | Evaluation 4 Storage Stability | Evaluation 5 Brightness | Evaluation 5 F/F value |
|---|---|---|---|---|---|---|---|
| Example 13 | Example 1 | ○ | ○ | ○ | ○ | ○ | ○ |
| Example 14 | Example 2 | ○ | ○ | ○ | ◎ | ○ | ○ |
| Example 15 | Example 3 | ○ | ○ | ○ | ○ | ◎ | ◎ |
| Example 16 | Example 4 | ○ | ○ | ○ | ◎ | ○ | ○ |
| Example 17 | Example 5 | ○ | ○ | ○ | ◎ | ○ | ○ |
| Example 18 | Example 6 | ○ | ○ | ○ | ○ | ◎ | ◎ |
| Example 19 | Example 7 | ○ | ○ | ○ | ◎ | ◎ | ◎ |
| Example 20 | Example 8 | ○ | ○ | ○ | ◎ | ◎ | ○ |
| Example 21 | Example 9 | ○ | ○ | ○ | ◎ | ◎ | ◎ |
| Example 22 | Example 10 | ○ | Δ | ○ | ○ | ○ | ○ |
| Example 23 | Example 11 | ○ | ○ | ○ | ○ | ○ | ○ |
| Example 24 | Example 12 | ○ | ○ | ○ | ◎ | ○ | ○ |
| Comparative Example 4 | Comparative Example 1 | Δ | ○ | Δ | XX | Standard | Standard |
| Comparative Example 5 | Comparative Example 2 | X | X | ○ | X | ○ | ○ |
| Comparative Example 6 | Comparative Example 3 | X | X | X | XX | Δ | Δ |

INDUSTRIAL APPLICABILITY

The present invention can provide a metallic pigment composition that can be used in coating compositions, ink compositions or the like, in particular, water-based coatings, water-based inks or the like, that is excellent in storage stability of coatings, that has small degradation in photoluminescence, hiding power, flip-flop feeling and the like when forming a coating film, and that is excellent also in adhesiveness and chemical resistance of the coating film.

The invention claimed is:

1. A metallic pigment composition comprising:
   metallic particles;
   0.01 to 10 parts by weight, based on 100 parts by weight of the metallic particles, of at least one heteropolyanion compound that is at least one selected from the group consisting of $H_3PW_xMo_{12-x}O_{40} \cdot nH_2O$ (phoshotungstomolybdicacid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate) and $H_{4+x}SiV_xMo_{12-x}O_{40} \cdot nH_2O$ (silicovanadomolybdic acid.n-hydrate), wherein $1 \leq x \leq 11$, $n \geq 0$;
   0.01 to 50 parts by weight, based on 100 parts by weight of the metallic particles, of an organic oligomer or polymer, which is an organic oligomer or polymer having interaction with at least one of the metallic particles and the heteropolyanion compound, which coexist, and is an organic oligomer or polymer that is obtained by performing a polymerization in the presence of the heteropolyanion compound and the metallic particles;
   and at least one phosphoric acid compound selected from inorganic phosphoric acids or salts thereof.

2. The metallic pigment composition according to claim 1, wherein the metallic particles are made of aluminum.

3. A metallic pigment composition comprising:
   metallic particles;
   0.01 to 10 parts by weight, based on 100 parts by weight of the metallic particles, of at least one heteropolyanion compound that is a salt of at least one selected from a heteropolyacid with at least one selected from ammonia and amine compounds represented by the following formula 1 and a mixed-coordination heteropolyacid with at least one selected from ammonia and amine compounds represented by the following formula (1):

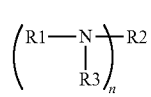

(1)

wherein R1, R2 and R3 may be the same or different, and are each a hydrogen atom, or a mono- or divalent hydrocarbon group having 1 to 30 carbon atoms that may optionally contain an ether bond, an ester bond, a hydroxyl group, a carbonyl group, and a thiol group, wherein R1 and R2 are optionally taken together to form a 5-membered or 6-membered cycloalkyl group, R1 and R2 are optionally taken together with a nitrogen atom to form a 5-membered or 6-membered ring that is capable of additionally containing a nitrogen or oxygen atom as a crosslinking member, or R1, R2 and R3 are optionally taken together to form a multi-membered multiring multi-ring composition that is capable of containing one or more additional nitrogen atoms and/or oxygen atoms as a crosslinking member; R1, R2 and R3 are not a hydrogen atom at the same time; and n represents a numerical value of 1 to 2, and wherein
   a heteroatom constituting the heteropolyanion compound is at least one selected from elements of Group 13, Group 14, and Group 15 in the periodic table, and a polyatom constituting the heteropolyanion compound is selected from transition metals;
   0.01 to 50 parts by weight, based on 100 parts by weight of the metallic particles, of an organic oligomer or polymer, which is an organic oligomer or polymer having interaction with at least one of the metallic particles and the heteropolyanion compound, which coexist, and is an organic oligomer or polymer that is obtained by performing a polymerization in the presence of the heteropolyanion compound and the metallic particles; and
   at least one phosphoric acid compound selected from inorganic phosphoric acids or salts thereof.

4. The metallic pigment composition according to claim 3, wherein the heteropolyacid is at least one selected from the group consisting of $H_3PMo_{12}O_{40}\cdot nH_2O$ (phosphomolybdic acid.n-hydrate), $H_3PW_{12}O_{40}\cdot nH_2O$ (phosphotungstic acid.n-hydrate), $H_4SiMo_{12}O_{40}\cdot nH_2O$ (silicomolybdic acid.n-hydrate) and $H_4SiW_{12}O_{40}\cdot nH_2O$ (silicotungstic acid.n-hydrate), wherein $n\geq 0$.

5. The metallic pigment composition according to claim 3, wherein the mixed-coordination heteropolyacid is at least one selected from the group consisting of $H_3PW_xMo_{12-x}O_{40}\cdot nH_2O$ (phosphotungstomolybdic acid.n-hydrate), $H_{3+x}PV_xMo_{12-x}O_{40}\cdot nH_2O$ (phosphovanadomolybdic acid.n-hydrate), $H_4SiW_xMo_{12-x}O_{40}\cdot nH_2O$ (silicotungstomolybdic acid.n-hydrate) and $H_{4+x}SiV_xMo_{12-x}O_{40}\cdot nH_2O$ (silicovanadomolybdic acid.n-hydrate), wherein $1\leq x\leq 11$, $n\geq 0$.

6. A method for producing a metallic pigment composition according to claim 1, comprising mixing metallic particles with the heteropolyanion compound in the presence of a solvent arbitrarily containing water and then polymerizing or mixing an organic oligomer or polymer.

7. A coating composition comprising the metallic pigment composition according to claim 1.

8. An ink composition comprising the metallic pigment composition according claim 1.

9. An article being coated with the coating composition according to claim 7.

10. A printed material being formed by the ink composition according to claim 8.

11. A coating film formed by the coating composition according to claim 7.

* * * * *